United States Patent [19]
Philibert et al.

[11] 3,871,091
[45] Mar. 18, 1975

[54] CLAMPING DEVICE

[75] Inventors: Robert A. Philibert, Burlington; Frank L. Browne, Bristol, both of Conn.

[73] Assignee: General Signal Corporation, Rochester, N.Y.

[22] Filed: Mar. 25, 1974

[21] Appl. No.: 454,632

[52] U.S. Cl.................. 24/243 R, 164/29, 248/72
[51] Int. Cl........ A44b 21/00, B22c 9/02, F16l 3/24
[58] Field of Search..... 24/243 CC, 243 G, 243 CR, 24/243 R, 243 S, 243 C; 164/27, 29, 364; 248/72

[56] References Cited
UNITED STATES PATENTS

| | | | |
|---|---|---|---|
| 498,749 | 5/1893 | Lovejoy | 24/243 S X |
| 1,003,722 | 9/1911 | Eckardt | 164/364 X |
| 1,224,309 | 5/1917 | Lupke | 248/72 |
| 1,774,878 | 9/1930 | Fitzpatrick | 248/72 |
| 2,071,959 | 2/1937 | Wayman | 248/72 |
| 2,163,635 | 6/1939 | Shea | 248/72 |
| 3,129,915 | 4/1964 | Budnick | 248/72 |

FOREIGN PATENTS OR APPLICATIONS

| | | | |
|---|---|---|---|
| 1,116,807 | 2/1956 | France | 164/29 |

Primary Examiner—Donald A. Griffin
Attorney, Agent, or Firm—Milton E. Kleinman; John Ohlandt

[57] ABSTRACT

A clamping device is disclosed for the purpose of fastening or attaching conduit to a beam or the like. The device is so cast in a mold that three critical surfaces are drafted parallel to each other whereby proper perpendicular relationship of a clamping bolt with a conduit cradling surface is established.

8 Claims, 6 Drawing Figures

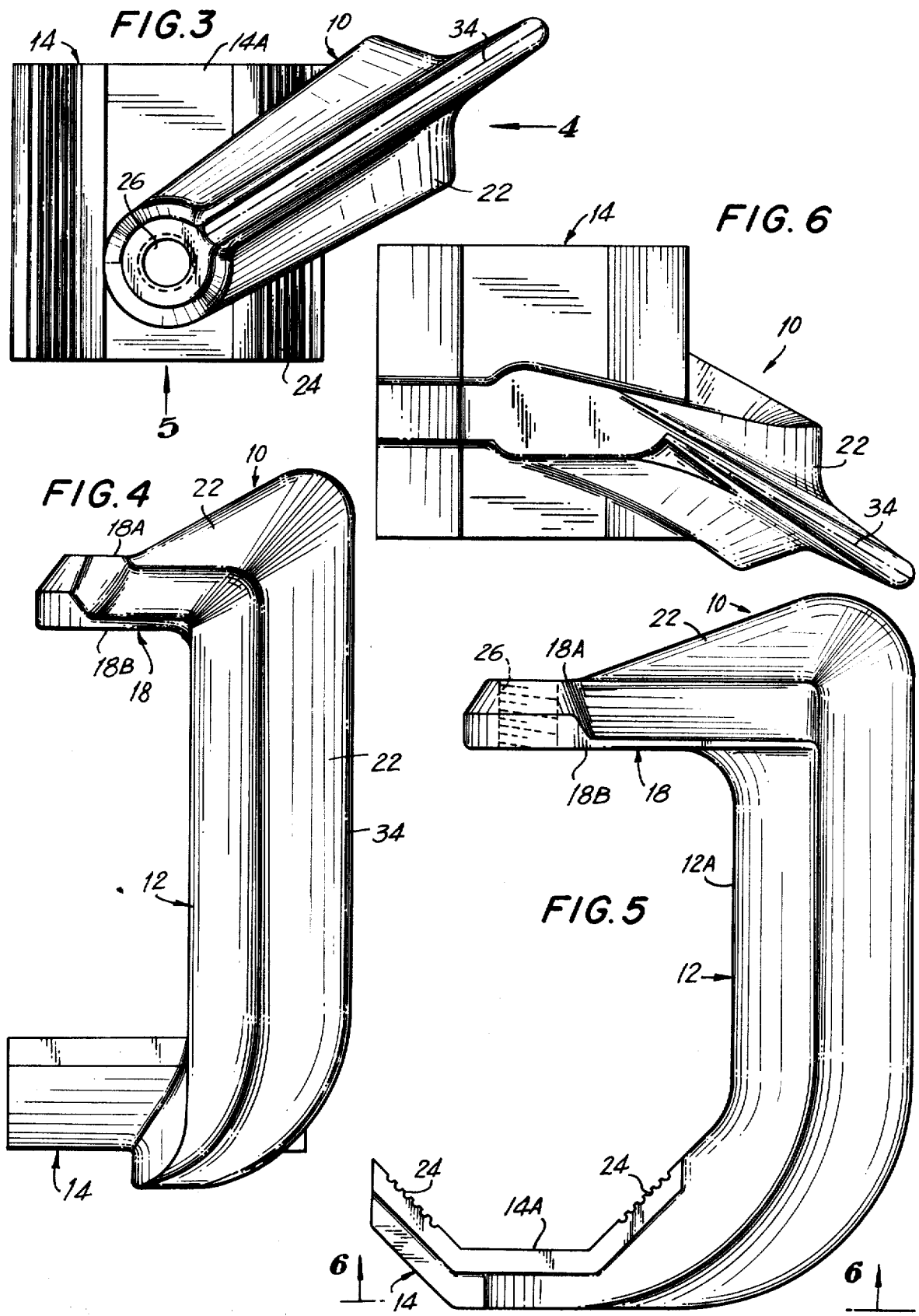

CLAMPING DEVICE

BACKGROUND, OBJECTS AND SUMMARY OF THE INVENTION

The present invention pertains to an improved clamping device for fastening or attaching conduit or pipe to a beam or similar structure.

The present invention is concerned with a clamping device structure and a specialized technique for fabricating that structure such that certain disadvantages and difficulties that have attended prior art constructions may be overcome.

In order to provide some background for the improvement of the present invention, reference may be made to U.S. Pat. No. 3,129,915 in which an angle beam clamp is described. The objective and purpose of the described device of that patent is to furnish a rugged clamp for fastening a cylindrical pipe, or other like axial body serving as a raceway conduit for electrical wire, to a building structure. Such described clamp structure is capable of providing any of the various clamp position arrangements normally encountered in building installations.

It has been found by the present inventors that prior art clamping devices have often possessed a disadvantage or deficiency in that they have a tendency to twist because of eccentric loading of the screw, which constitutes part of the clamping device, on the conduit. Very often the torque values on this screw are not up to the full torque expected to be employed. In such cases the clamping devices have been found to tend to distort, bend or stretch at torque values that are less than 50 percent of the recommended tightening torque for the particular size of bolt or screw involved.

Accordingly, it is a principal object of the present invention to produce a clamping device which is thoroughly reinforced in those areas where maximum distortion tends to occur.

A further discovery made by use is that a particular source of the difficulty or problem aforenoted resides in the fact that there is a lack of parallelism between the upper and lower surfaces of the arm of the clamping device. Hence, when the hole for the screw is drilled and tapped, the hole is not made substantially perpendicular to the axis of the cradle surface of the clamp. This is because in the drilling operation the lower surface of the clamp arm is normally firmly abutted against a confronting surface on a conventional jig. The confronting surface is designed to be perpendicular to the drill bit. Accordingly, when the clamp arm is so placed against the confronting face, the drill bit makes the hole off perpendicular by the extent of the deviation of the lower surface from parallelism with the upper surface. This deviation from parallelism stems from the fact that certain well known procedures are followed in the casting of metals and the like.

Casting of metals and the like in sand molds is a well known technique and some of its aspects can be appreciated by reference to a standard work on the subject such as "Materials and Processes", edited by James F. Young and published by John Wiley & Sons, copyrighted 1943, 1944 by General Electric Company. As noted at page 335 of the aforesaid reference, all surfaces perpendicular to a parting plane in a casting process are generally given a slight taper or draft to permit easy removal of the pattern without excessive loosening, thereby making the sand mold larger, or tearing of the mold walls. The amount of draft usually allowed depends on the shape and size of the castings, the molding method, and the type of sand used.

In any event, the present invention has for another primary object the overcoming of the difficulty due to the aforesaid lack of parallelism between critical surfaces and to provide a clamping device in which the desired parallel relationship is achieved, and hence the distortion characteristics of the clamp are greatly improved.

The immediately above stated primary object is implemented, in accordance with a feature of the present invention, by reversing the draft on a critical portion of the arm of the clamping device, i.e., on the lower surface of the arm, whereby the upper and lower surfaces on the arm are formed in parallel relationship. This means that, when the clamping device is placed into a conventional jig, the drilled and tapped hole is properly made into the upper surface of the clamp arm which, as explained above, is the normal method of drilling and tapping — and the result is that the screw to be inserted into the tapped hole will necessarily be perpendicular to the conduit or pipe. Therefore, the stated primary object is achieved.

In addition, the first recited object is also realized in that the clamping device of the present invention is specially constructed so as to provide reinforcement in those areas where maximum distortion tends to occur. Thus the web portion of the clamping device is designed to extend from the conduit-carrying or cradle end to the arm portion and is formed with a greater width than heretofore known. Furthermore, a median flange extends outwardly from the web and longitudinally with the web, and further extends so as to encompass a significant part of the arm portion of the clamping device. Further features, objects and advantages of the present invention will become apparent from the following description taken in conjunction with the annexed drawing.

BRIEF DESCRIPTION OF THE DRAWING:

FIG. 3 is a plan view of the clamping device.

FIG. 4 is a side elevation view of the clamp from a location as indicated on FIG. 3.

FIG. 5 is a side elevational view from another location as indicated on FIG. 3.

FIG. 6 is a bottom plan view of the clamping device.

DESCRIPTION OF PREFERRED EMBODIMENT

Figure 1:
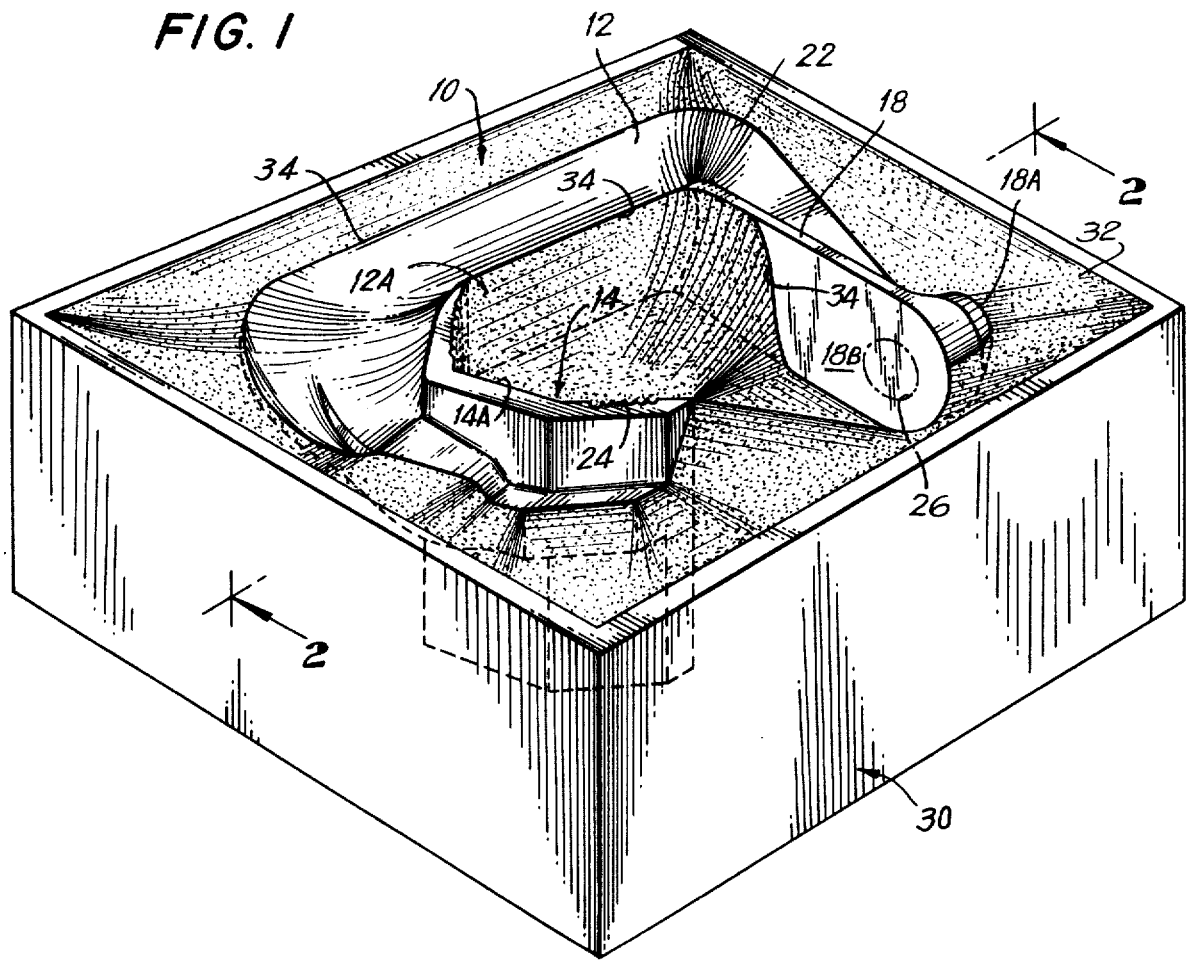
FIG. 1 is a perspective view of an angle beam clamping device, constituting a preferred embodiment of the present invention, the device being shown in the lower half of a mold used in fabricating the device.

Referring now to the figures, there is illustrated therein a clamping device 10 in accordance with the principles of the invention. Clamping device 10 is essentially a J-shaped clamp body consisting of a web 12 and a cradle or support 14 for a conduit not shown. Integrally formed with the upper end of the device 10 is an arm 18 having upper and lower surfaces 18A and 18B. The web 12 of the clamping device has a convex surface 12A at the front thereof, that is, the surface which is intended to be adjacent to the conduit.

It will be noted that the cradle 14 is canted relative to the body portion of the clamp, that is to say, while the arm 18 extends at a substantially right angle with the web 12, the cradle 14 has an angular relationship of approximately 45 degrees with the web 12. Also, it should be noted that a flange 22, for the purpose of structural reinforcement, extends outwardly and around the body portion, i.e. around the web 12 and the arm 18.

The cradle formed at the lower end has an upper supporting surface 14A that is almost arcuate, being made up of two sloping side portions, each provided with grooves 24, and a horizontal central portion. This particular construction for the cradle permits the supporting of conduit or pipe in a variety of sizes. For example, the clamp illustrated can accommodate conduit sizes from 2 ½ to 3 inches in rigid conduit, and 2 ½ to 3 inches in electrical metallic tubing.

Because of the angular relationship between the cradle 14 and the web 12 of the clamping device 10, the arm 18 does not confront the cradle surface in the same manner as with some devices known to the prior art, such as the one described in U.S. Pat. No. 3,129,915. Rather, the cradle 14 is also in a canted or offset relationship with the arm 18, as best seen in FIGS. 3 and 6. However, the length of the arm 18 is so chosen that, when an appropriate hole 26 is provided at the end of the arm, a screw or bolt placed into the hole may be extended therethrough sufficiently to make contact with one surface of a structural beam or the like, as used in typical building constructions. The conduit supported in the cradle 14 will thereby be firmly held up against the opposite surface of such structural beam.

It will thus be understood that the arm 18 and cradle 14 are so designed as to enable variable-angle clamping of conduit to a structural beam. That is to say, referring for example to FIG. 3, let it first be assumed that the conduit supported in the cradle 14 is extending parallel to the flange of a structural beam. In such case the shape chosen for the clamp 10 will permit the flange to be admitted, and the screw provided will extend to the upper flange surface. On the other hand, let it next be assumed that the conduit is extending at right angles (90° from the previous case) to the flange. In the second case, the screw will again extend so as to contact the same flange surface, but with an orientation for the clamp 10 which is 90° clockwise from the first case depicted in FIG. 3. Of course, any location between the two extremes can also be selected.

Figure 2:
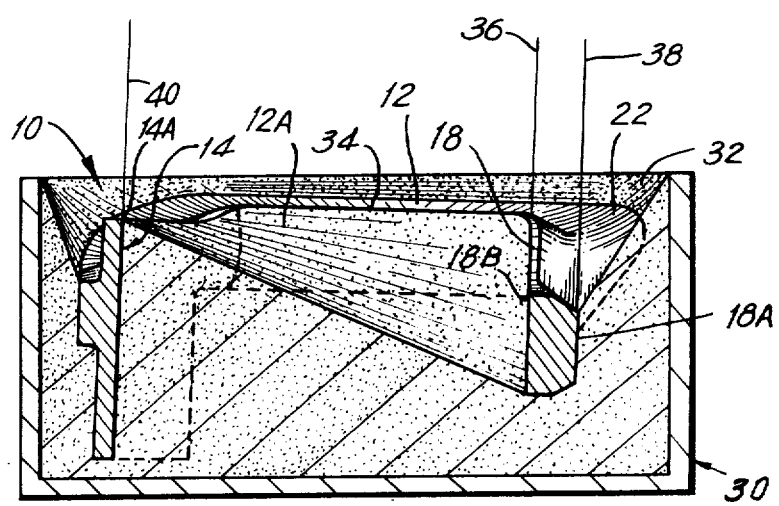
FIG. 2 is an elevation view of said clamping device in section taken along line 2—2 of FIG. 1.

Referring now particularly to FIGS. 1 and 2, the technique for fabricating the clamping device 10 of the present invention is illustrated. This technique achieves the fundamental objective of insuring that the clamping screw is always perpendicular to the conduit cradle 14. This results from the special way in which the clamping device is formed by the mold. The lower part 30 of a flask is illustrated, such flask containing the lower portion or "drag" 32 of the sand mold. The upper portion or "cope" is not seen; however, it will be apparent that the cope is formed in complementary fashion. It will also be seen that the "parting line" 34 (FIG. 1) is the line of demarcation between cope and drag and that it extends entirely around the piece.

It will be further noted in FIG. 1 that the lower surface 18B of the arm 18 is defined by an appropriately shaped complementary area of the cope; more particularly, by an area having a "draft" angle represented by line 36 in FIG. 2; that is, by a slight deviation from the perpendicular sufficient to permit ready separation of the cope and drag without disturbing the sand pattern.

It is precisely because the surface 18B is defined by the cope, contrary to conventional practice, that all three surfaces 18A, 18B and 14A of the clamping device 10 will be parallel. Since surfaces 18A and 14A are both defined by the drag, that is by the lower portion 32 of the sand mold, these surfaces must be parallel to each other. This can be seen in FIG. 2 by reference to the line 38 and 40 respectively, which represent the "draft" for these surfaces. It will be recognized that this parallel relationship between 18A and 14A is normal or conventional; that is, because these are "like" surfaces, both being at the right side of the individual sections of the same mold half. However, if surface 18B were also defined by the drag — in conventional manner — the result would be non-parallelism with surfaces 18A and 14A, since surface 18B would be on the left side of the given section in the same mold half, and therefore would have an opposite "draft". However, since by the arrangement of the present invention the surface 18B is defined by the other mold half, that is, by the cope, the left side of this complementary half has the same draft angle. Therefore at least the two critical surfaces, namely 18B and 14A, are assured to be parallel and hence, since the hole 26 is formed so as to be perpendicular to surface 18B, from the hole 26 to perpendicular 18B it will necessarily be perpendicular to surface 14A.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A clamping device fastening a conduit or the like to a structural beam and comprising:
    a body having a straight web portion extending between upper and lower ends of said body, said web portion having a convex inner surface adapted to be adjacent to said conduit;
    a flange projecting outwardly from said web portion;
    an arm extending from the upper end of the web portion at a substantially right angle therewith;
    a cradle extending from the lower end of the web portion, said cradle being offset or canted with respect to said arm;
    said clamping device being produced by forming the mold halves which define the clamping device such that at least part of the parting line extends substantially along the axis of symmetry of said web of said clamping device and such that the upper surface of the arm of the device is defined by one of the mold halves, said parting line continuing therefrom in such manner that the lower surface of the arm is defined by the other half of the mold, whereby at least said upper and lower surfaces of the arm adjacent to a hole to be formed therein are parallel.

2. A device as defined in claim 1, in which said flange extends outwardly from said arm along a substantial part of the length of the arm.

3. A device as defined in claim 1, in which said cradle includes an upper supporting surface which is parallel to said portions of the upper and lower surfaces of said arm.

4. A device as defined in claim 3, in which the upper supporting surface of said cradle has a horizontal central portion and sloping side portions provided with grooves.

5. A process for producing a clamping device, having a longitudinal web and flange, and including an arm at a substantially right angle with the web, said device being adapted to fasten a conduit or the like to a structural beam, comprising the steps of:

forming the mold halves which define the clamping device such that at least part of the parting line extends substantially along the axis of symmetry of said web of said clamping device and such that the upper surface of the arm of the device is defined by one of the mold halves, said parting line continuing therefrom in such manner that the lower surface of the arm is defined by the other half of the mold, whereby at least said upper and lower surfaces of the arm adjacent to a hole to be formed are parallel.

6. A process as defined in claim 5, in which said flange is formed to extend outwardly from said arm along a substantial part of the length of the arm.

7. A process as defined in claim 5, in which said cradle is formed to have an upper supporting surface which is parallel to said upper and lower surfaces of the arm.

8. A process as defined in claim 7, in which the upper supporting surface of said cradle is formed to have a horizontal central portion and sloping side portions provided with grooves.

* * * * *